Feb. 4, 1958  J. E. RICHTER ET AL  2,821,794
CABLE OPERATING MEANS FOR EARTH MOVER
Filed Jan. 25, 1954  6 Sheets-Sheet 5
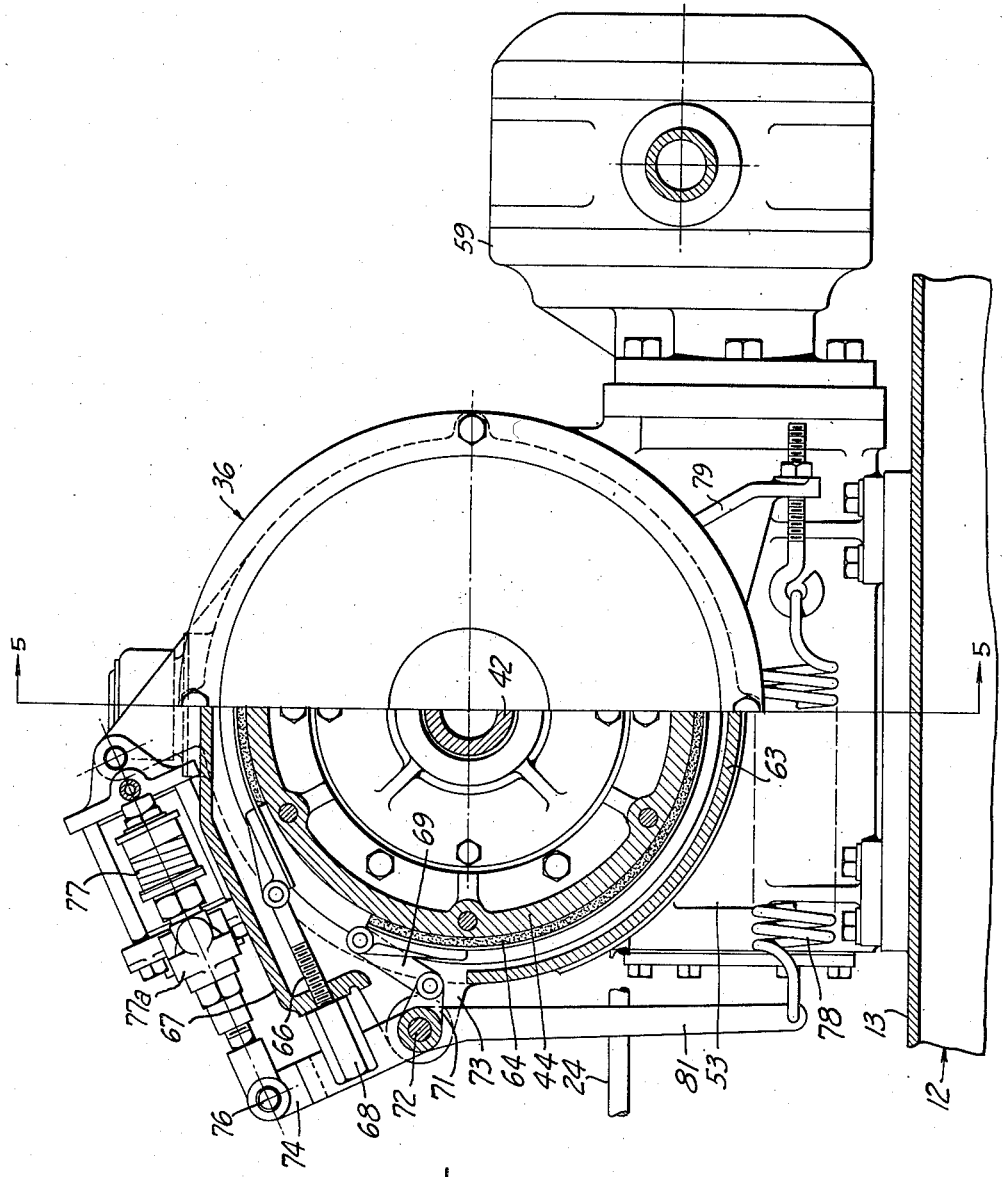
FIG_7_
INVENTORS
John E. Richter
Neo Corsini
BY
ATTORNEYS

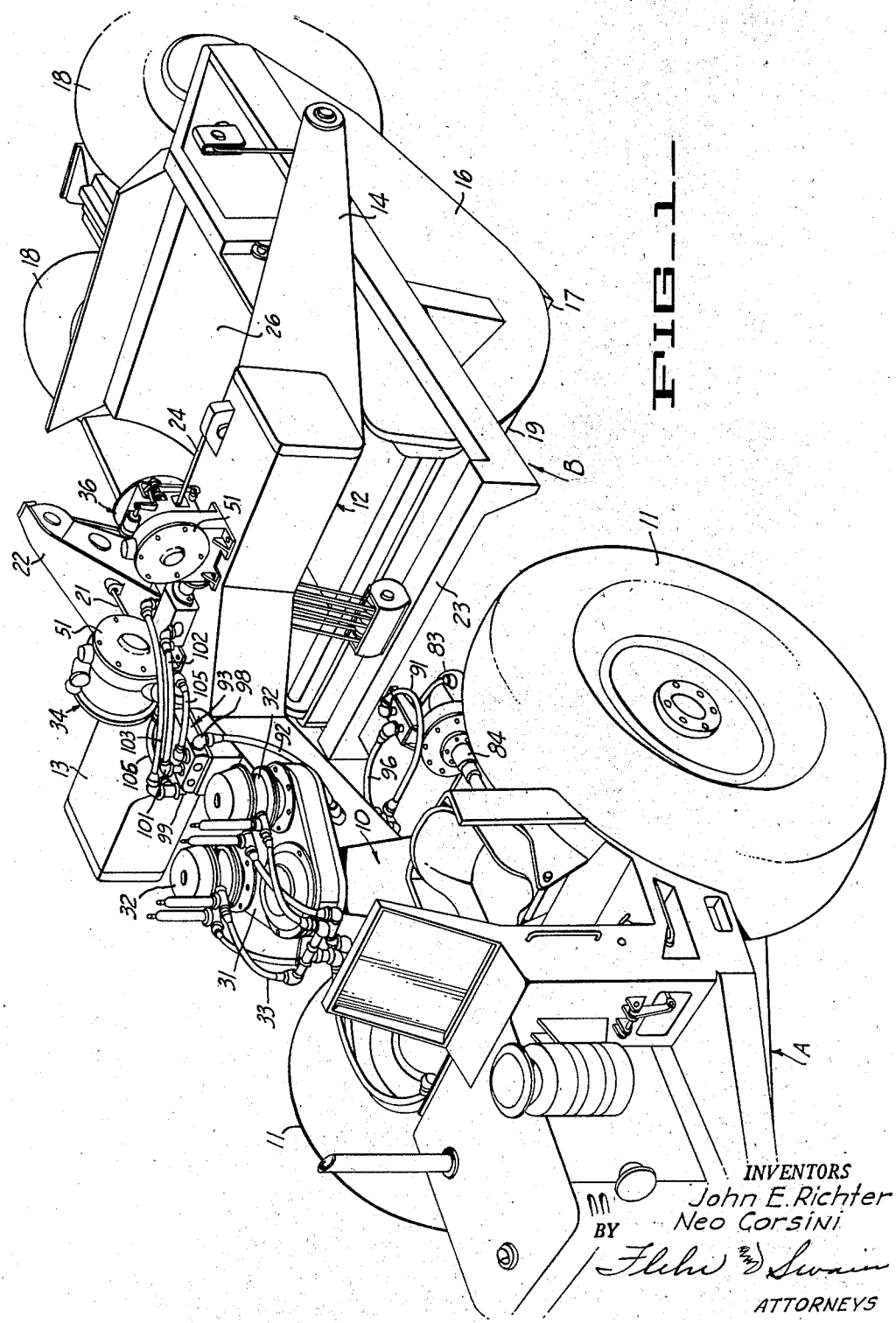

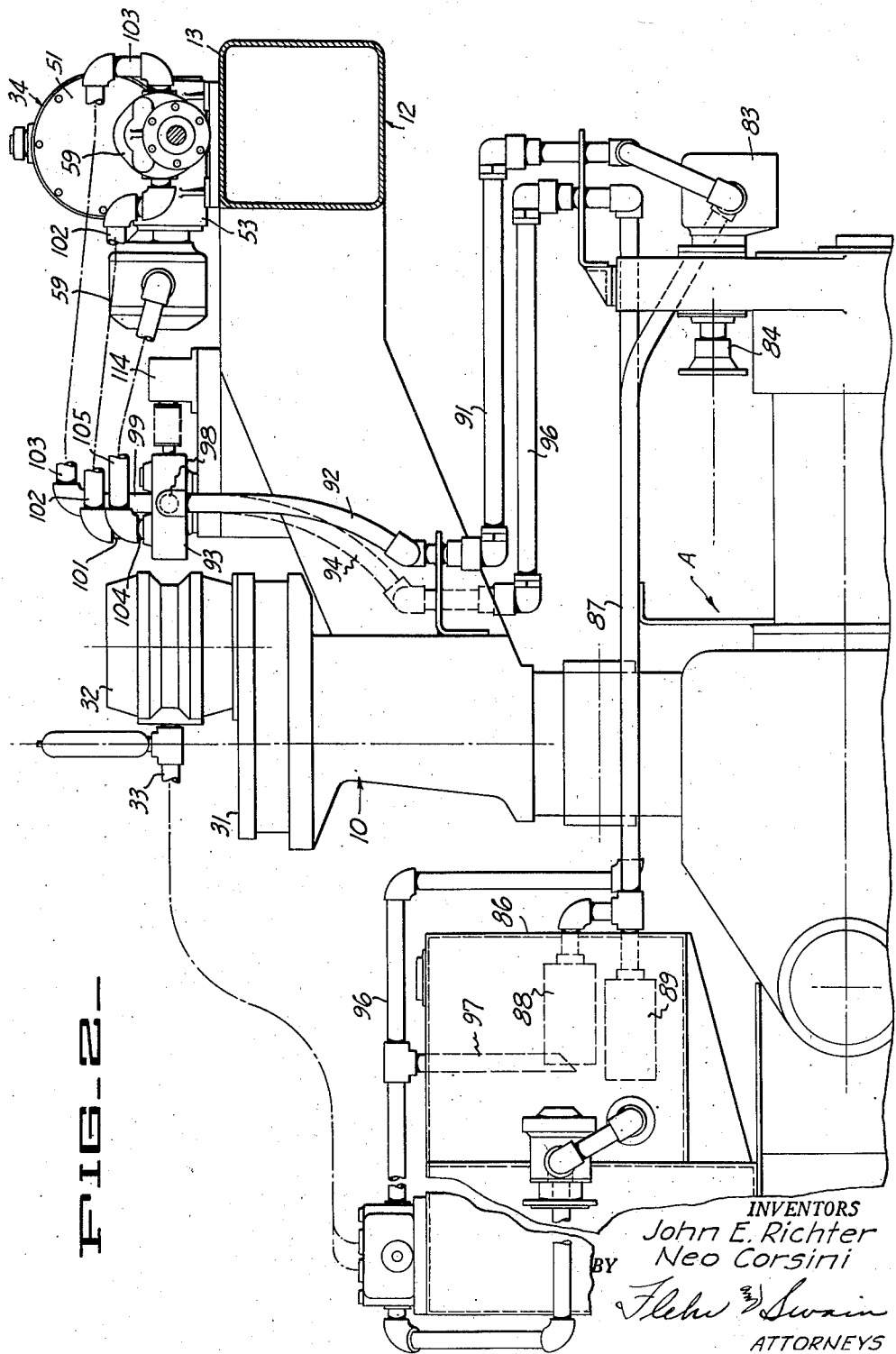

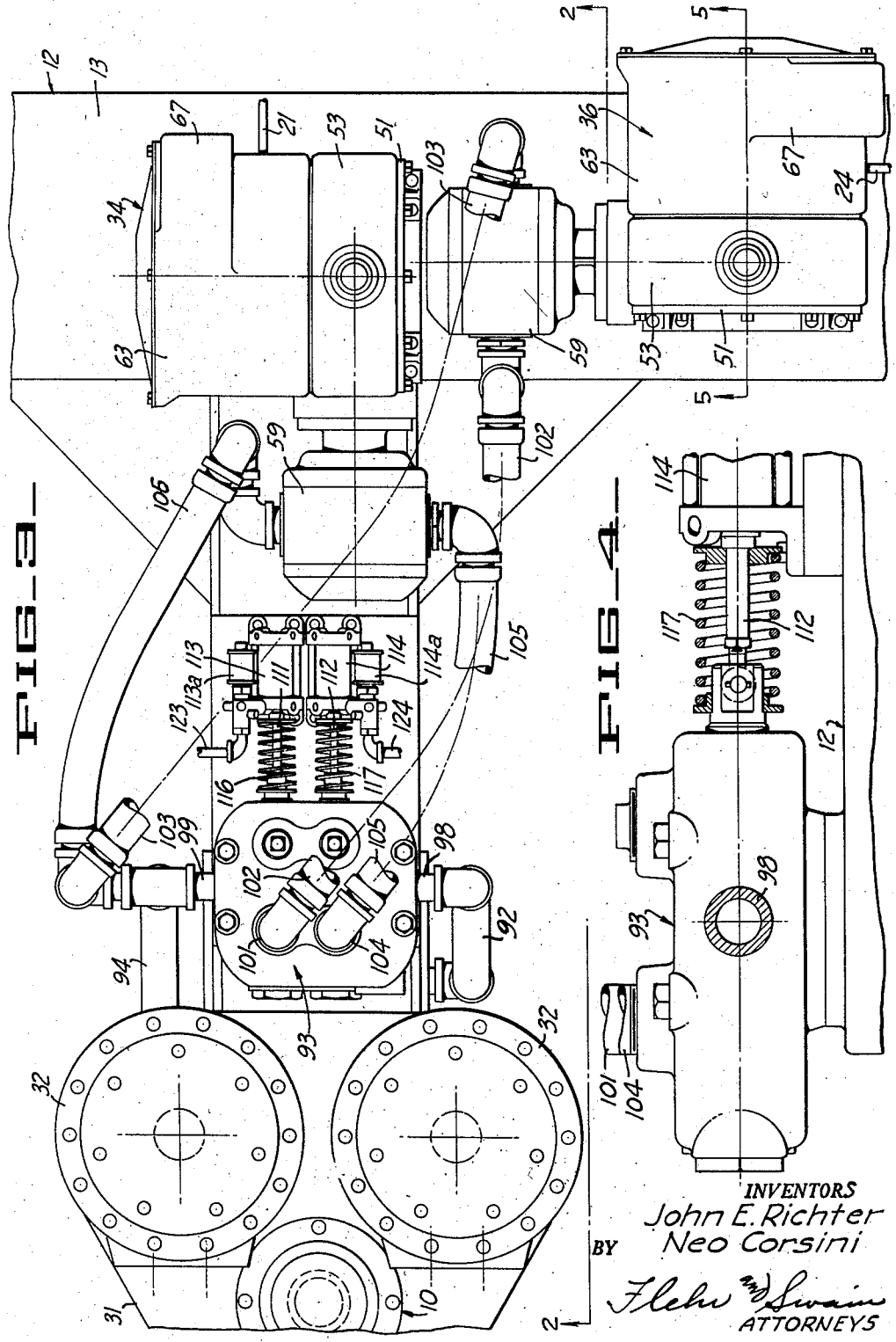

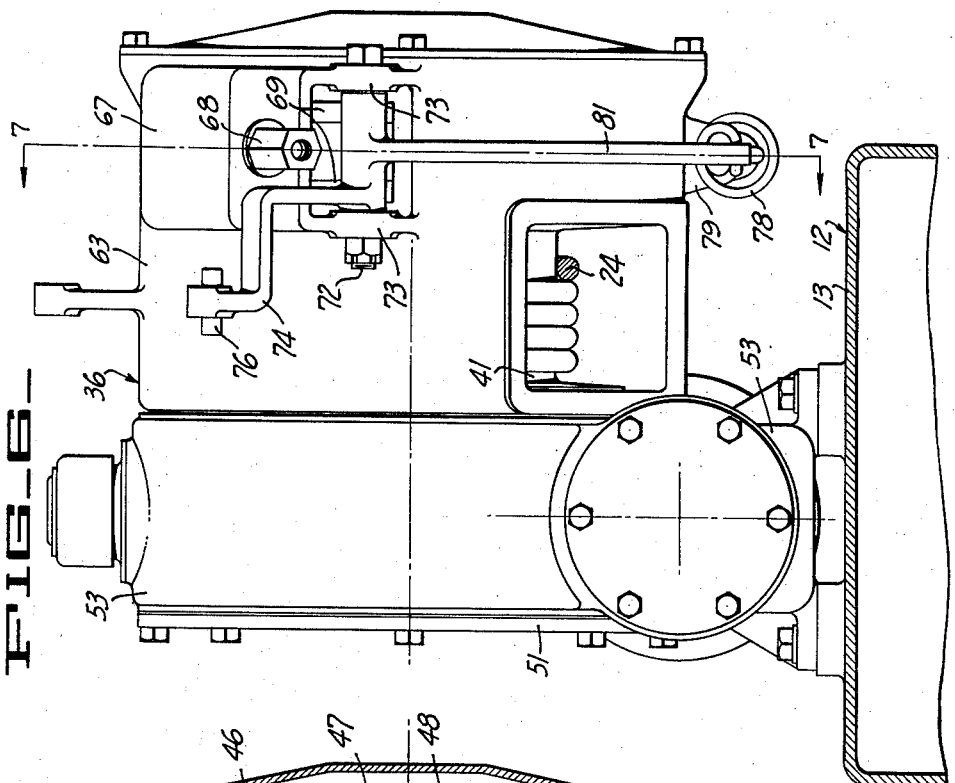
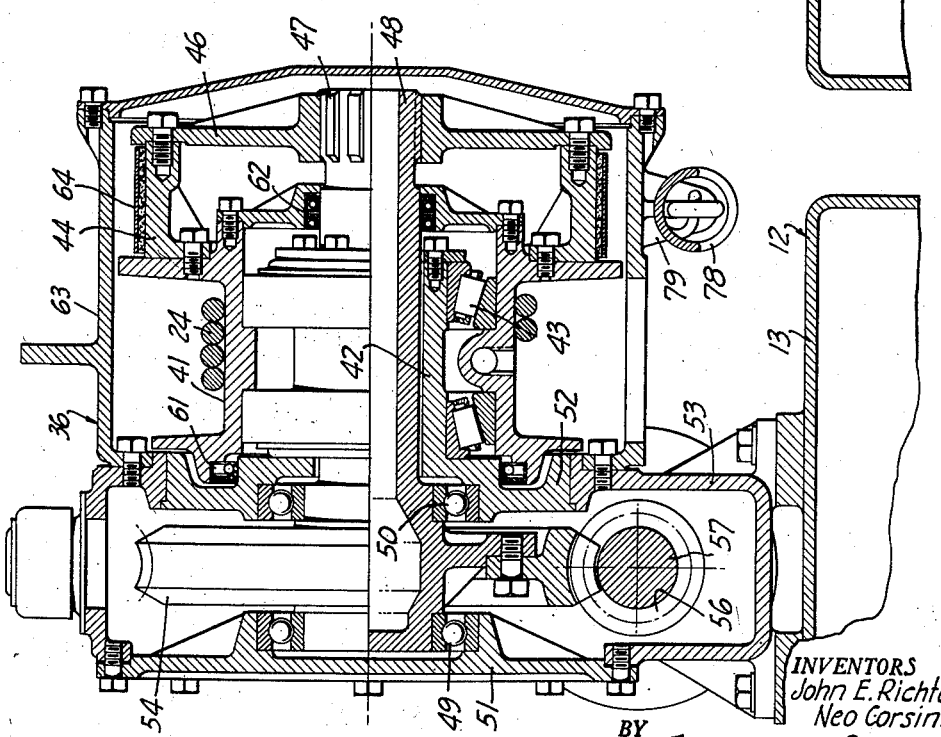

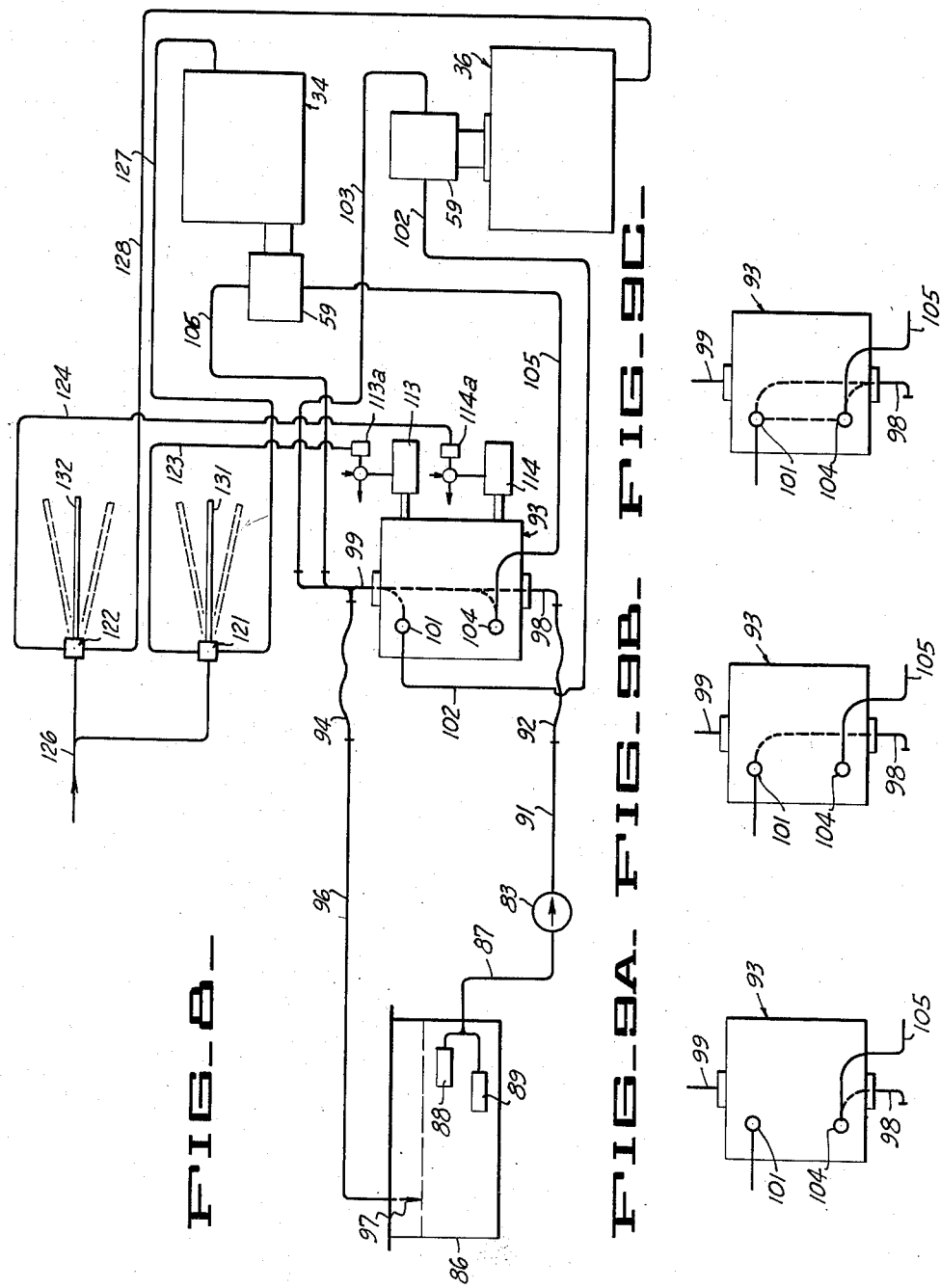

United States Patent Office 2,821,794
Patented Feb. 4, 1958

2,821,794

CABLE OPERATING MEANS FOR EARTH MOVER

John E. Richter, San Jose, and Neo Corsini, Sunnyvale, Calif., assignors, by mesne assignments, to Continental Copper & Steel Industries, Inc., New York, N. Y., a corporation of Delaware Application January 25, 1954, Serial No. 405,994

1 Claim. (Cl. 37—126)

This invention relates generally to the construction of earth movers such as are designed for earth digging and carrying operations.

One widely used type of earth mover employs a main bowl which is provided with an earth digging blade, and which is carried by a wheeled frame in such a manner that it can be raised or lowered. The main bowl is provided with means such as a slidably mounted expeller, or hinged bottom, which can be operated to expel a load from the bowl. A so called apron is carried in front of the bowl and is adapted to be raised or lowered relative to the cutting blade. Operating cables are used for effecting the various required operations, namely for raising and lowering the cutting blade relative to the ground, for raising and lowering the apron, and for operating the load expelling means. In many instances (see for example Wooldridge 2,262,310) two operating cables are employed, together with two winch drums upon which the cables are wound. One cable serves to control the raising or lowering of the cutting blade, and the other serves to control both the front apron and the load expelling means. In other instances three operating cables are provided, together with three winch drums, with one cable serving to raise or lower the cutting blade, the second operating the front apron, and the third operating the load expelling means. Irrespective of whether or not two or three cables and corresponding winch drums are employed, the location and operation of the winches presents a problem, particularly when the earth mover is of the self propelled or motor powered type (see for example Clark Reissue 23,251).

In general it is an object of the present invention to provide an earth mover having improved means for operating and controlling the cable drums.

A further object of the invention is to provide an improved means of the above character which permits a more convenient location of the drums, and which facilitates their control by hand levers within convenient reach of the operator.

Another object of the invention is to provide improved means of the above character in which selective cable winding and unwinding operations can be more readily controlled as desired.

Another object of the invention is to provide a new cable winch unit which is operated by hydraulic pressure for cable winding operations, and controlled pneumatically for cable unwinding.

Additional objects and features of the invention will appear from the following description in which the preferred embodiment has been set forth in detail in conjunction with the accompanying drawings.

Referring to the drawings:

Figure 1 is a perspective view illustrating an earth mover incorporating the present invention.

Figure 2 is an enlarged side elevational view illustrating a portion of the machine of Figure 1, particularly the hydraulic system and piping connected with the same, for driving the cable drums.

Figure 3 is an enlarged detail in plan illustrating a part of the machine shown in Figure 1, namely the winch and associated parts of the hydraulic system.

Figure 4 is a view showing the control valve used in the hydraulic system, with portions in section.

Figure 5 is a cross sectional view taken along the line 5—5 of Figure 3, and on an enlarged scale.

Figure 6 is a side elevational view of the same winch unit shown in Figure 5.

Figure 7 is a partial cross sectional detail taken along the line 7—7 of Figure 6.

Figure 8 is a schematic layout showing the complete control system for the winch units.

Figures 9A, 9B and 9C are schematic views illustrating different operating positions of control valve 93.

In general the earth mover shown in Figure 1 consists of tractor and trailer units A and B, which are connected by the kingpin assembly 10. The tractor unit can include a suitable motor (not shown) which is carried upon the tractor frame, and which drives the wheels 11 through change transmission and differential. The trailer B consists of a yoke-like frame 12, which includes the crossbeam 13, and rear extensions 14. The main bowl 16 is provided with a forward earth digging blade 17, and at its rear end is attached to the axle assembly for the wheels 18. An apron 19 is carried near the front of the bowl, and is adapted to be raised or lowered relative to the digging blade 17. The operating cable 21 is reaved between sheaves carried by the beam extension 22 and the main bowl crossbeam 23, to thereby raise or lower the main bowl in conjunction with its ground digging blade.

The cable 24 is reaved to cause sequential operation of the front apron and the expeller means for the main bowl. The expeller means in this instance consists of the main bowl bottom 26, which is hinged at its forward edge to the cutting blade 17, and which can be swung upwardly and forwardly to expel material from the main bowl.

The trailer arrangement described above can be similar to what is disclosed in co-pending application Serial No. 223,903, filed May 1, 1951, now Patent No. 2,687,584.

Various arrangements can be used to apply steering forces between the trailer and the tractor. For example we can use hydraulic steering means of the type disclosed in Clark Reissue 23,251. The particular steering means illustrated is of the hydraulic type but makes use of the arrangement disclosed in co-pending application Serial No. 314,266, filed October 11, 1952, and now abandoned. Briefly it consists of a housing 31 which is mounted upon the upper end of the kingpin assembly hub, and which serves to mount the two hydraulic motors 32. By means of gearing (not shown), in the housing 31, the shafts of motors 32 are operatively connected to the kingpin. Piping 33 serves to connect the motors 32 to a hydraulic system which includes a suitable liquid pump (not shown) together with a manually controlled pilot or control valve (not shown). By operating the control valve the motors 32 can be driven in opposite directions to turn the tractor to any desired angle with respect to the trailer.

In operating the machine described above, it is moved forwardly and the cable 21 played out to lower the digging blade. As the digging blade penetrates the ground material passes into the main bowl. As the load approaches full capacity the front apron is permitted to drop by playing out the cable 24. At the end of the loading operation the digging blade is raised above the ground level by winding up the cable 21, after which the machine proceeds to the location where it is desired to discharge and spread the load. With the cutting blade 17 at a desired level over the ground surface, depending upon the depth of spread desired, cable 24 is taken up whereby the front apron is first elevated to permit partial discharge of the load, after which continued pulling on cable 24 causes the hinged bottom 26 to be swung upwardly and forwardly, to completely discharge the load.

It is possible to extend the operating cables 21 and 24 over suitable sheaves to the tractor, where they may engage suitable winch units selectively operable to secure the desired cable operations. However such an arrangement possesses a number of disadvantages, including for example the fact that it requires extended lengths of exposed cable which complicate detachment of the tractor from the trailer. Furthermore such conventional arrangements generally employ a direct mechanical drive from the tractor engine to the winch drums, through mechanical gearing and clutches which have objectionable characteristics. In accordance with the present invention we employ special cable operating winch units 34 and 36, which are mounted upon the crossbeam 13 of the machine frame. Winch unit 34 controls cable 21, and unit 36 controls the cable 24. A suitable construction for these winch units is shown in Figures 5 to 7 inclusive. Thus each unit consists of a cable drum 41, which is journaled to the housing tube 42 by suitable means such as the roller bearing assemblies 43. A brake drum 44 is rigidly secured to one end of the cable drum, and is in turn rigidly secured to the end plate 46. This plate has a spline connection 47 with the drive shaft 48, whereby it serves to transmit torque to the drum 44 and thence to the cable drum 41, as the shaft is rotated. One end of the shaft 48 is enlarged and is carried by the longitudinally spaced ball bearing assemblies 49 and 50, which in turn are carried by the walls 51 and 52, of the rigid housing 53. A worm gear 54 is fixed to the shaft 48 between the ball bearing assemblies 49 and 50, and is engaged by the worm 56. The shaft 57, upon which worm 56 is mounted, is journaled in the housing 53 and has one end of the same (not shown) directly coupled to the rotatable shaft of the fluid operated motor 59 (Figure 7). The gear drive thus established between shafts 57 and 48 is reversible, in that when the motor 59 is in such condition that its shaft is free to rotate, a torque applied to the cable drum 41 may rotate the same, together with rotation of shaft 57.

While details of the winch unit may vary, it will be noted that the particular design illustrated employs an oil and dust seal 61 between the cable drum and the housing wall 52. Additional oil and dust seals 62 are shown applied between that end of the drum nearest the plate 46, and the shaft 42. The drum and its associated parts are shown enclosed by the housing 63, which is rigidly secured to the housing 53. The friction brake band 64 engages the peripheral surface of the drum 44, and is arranged in such a manner as to provide self-energizing braking means which permits rotation in one direction, but automatically prevents rotation in the opposite direction. Thus as shown in Figure 7, one end of the band 64 is attached to the anchoring bolt 66, which extends through the housing part 67, and is engaged by the nut 68. The other end of the brake band is attached to one end of the link 69, the other end of which is attached to the arm 71. A shaft 72 is journaled to the portion 73 of the housing 63, and carries both the arm 71 and an operating lever 74. The free end of arm 74 is connected by a pin 76 to the pneumatic operator 77. This operating unit can be of the bellows, cylinder and piston or expansible tube type, and is constructed whereby, when air or other fluid under pressure is supplied to the same, arm 74 is swung in a clockwise direction as viewed in Figure 7, to release the brake band. Supply of air to the unit is controlled by a solenoid air valve 77a. Normally the brake band is urged toward engaged position by the tension spring 78, one end of which is anchored to the stationary bracket 79 and the other end of which is attached to the arm 81. This arm is likewise carried by the shaft 72, and tends to rotate arm 74 in a counterclockwise direction.

A self-energizing brake as described above permits rotation of the brake and cable drums in a counterclockwise direction as viewed in Figure 7, to wind up the cable. However it automatically grips the cable drum to prevent rotation in the opposite direction when driving torque from the motor 59 is discontinued. Unwinding rotation of the drum can be controlled by applying air or other fluid (i. e. oil etc.) under pressure to the operator 77, which as previously explained expands the brake band and thus releases its braking engagement with the drum.

The hydraulic units 34 and 36 are connected with both pneumatic and hydraulic systems, whereby an operator may selectively control both unwinding and cable winding operations for both units. Parts of a suitable hydraulic system are illustrated in Figures 2 and 3. A hydraulic pump 83, capable of supplying the desired operating hydraulic pressure, is mounted upon a part of the tractor, and is provided with a coupling 84 for direct connection to a rotating part of the engine. An oil reservoir 86 has an outlet pipe 87 which connects to the inlet side of the pump 83. The pipe 87 can be provided with oil strainers or filters 88 and 89. A pressure pipe 91 connects from the outlet side of the pump 83 to a flexible hose section 92, which in turn connects to the control valve 93. Another flexible hose section 94 connects between the control valve 93 and the return pipe 96, the latter extending to the reservoir 86 for delivery of the returned oil into the reservoir through the pipe section 97.

The hose sections 92 and 94 are connected with passages in the body of the control valve 93, by way of the pipe connections 98 and 99. A pipe connection 101, leading from the housing of the control valve 93, is connected by the flexible hose section 102 with the pressure side of the motor 59 for winch unit 36. The outlet or low pressure side of the motor 59 is connected by the flexible hose section 103 with the pipe connection 99. Another connection 104 to the housing of the control valve 93 is connected by the flexible hose section 105 with the inlet or pressure side of the motor 59 for the winch unit 34. The outlet or low pressure side of this motor is connected by the flexible hose section 106 with the valve connection 99.

The particular type of control valve 93 which is illustrated in the drawings, is provided with the operating rods 111 and 112, which in turn connect with the pneumatic operating devices 113, 114, which can be of the piston-cylinder type. A source of air or other fluid under pressure is adapted to be connected to these devices, under the control of the solenoid operated valves 113a and 113b. The compression springs 116, 117 serve to urge the rods 111, 112 toward the left as viewed in Figure 3, and when the devices 113 and 114 are actuated by application of air under pressure, the rods are pulled toward the right.

Figure 8 schematically illustrates a complete system for controlling the two winch units to wind up or unwind either one of the two cables from the operator's cab. In this view the same numerals are used to designate the lines and other parts which schematically represent the piping and other parts previously described with reference to Figures 2, 3 and 4.

Two manually operated electrical control switches 121 and 122 are arranged to be operated in the operator's cab. Line 123 from switch 121 represents circuit connections to the control solenoid 113a of the pneumatic operator 113. Similarly, line 124 represents circuit connections between the switch 122 and the control solenoid 114a of the pneumatic operator 114. Line 126 represents connections of the two circuits to a source of energizing current. Line 127 represents circuit connections from switch 121 to the solenoid control valve 77a for the winch unit 34. Similarly, line 128 represents circuit connections from switch 122 to the solenoid control valve 77a for the unit 36. Both the switches 121 and 122 are provided with hand levers, and each lever can be moved from a control position, shown in solid lines, to raised or lowered operating positions illustrated in dotted lines.

When handle 131 is raised a circuit is established to the solenoid valve 113a, and when it is lowered a circuit is established by way of line 127 to the solenoid valve for unit 34. Similarly, when handle 132 is raised an energizing circuit is established by way of line 124 to the solenoid valve 114a, and when it is lowered an energized circuit is established by way of line 128 to the solenoid valve of winch unit 36. As previously pointed out, the control valve 93 is conditioned in accordance with energization of solenoid valve 113a and 114a, which in turn causes pneumatic pressure to be applied to or vented from the pneumatic operators 113 and 114. The dotted lines applied through the valve 93 in Figure 8 represent connecting fluid flow ports for de-energized condition of the devices 113 and 114. Note that 98, 99, 101 and 104 are all connected. With the pump 83 in operation the liquid circulates directly through the control valve 93 and back into the reservoir 16 on the inlet side of the pump. The pressure and exhaust piping connected to each of the motors are directly connected through the control valve so that liquid does not restrain the motor against rotation in response to releasing the cable drum braking means. Assuming now that one desires to permit the cable engaged by the winch unit 34 to be unwound, the handle 131 is lowered whereby air pressure is applied to the pneumatic operator associated with unit 34. As a result the brake band is released whereby the cable drum is permitted to rotate to unwind or play out the cable. The winch unit 36 can be similarly operated by operating the hand lever 132. If the operator desires to wind up the cable associated with the winch unit 34, hand lever 131 is raised whereby air under pressure is supplied to the pneumatic operator 113. As a result the control valve 93 is conditioned whereby 99 and 101 are disconnected with respect to the other connections, and whereby 98 and 104 are connected, as shown in Figure 9A. Liquid under pressure is now supplied through pipe 91, through the control valve, and to the motor 59 of the unit 34. The liquid exhausted from the outlet side of this motor passes back through pipe 96 to the reservoir 16. Operation of motor 59 winds up the cable to the extent desired, after which lever 131 can be returned to its neutral position. Immediately upon returning lever 131 to its neutral position the control valve 93 is reconditioned in the manner illustrated in Figure 8. Because of the action of the self-energizing brake associated with the winch unit, the cable drum is held against unwinding rotation. Similarly when the lever 132 is depressed from a raised to a neutral position, the cable drum 41 is held against unwinding movement. When the hand lever 132 is raised the pressure is applied to operate device 114. This serves to condition the control valve in the manner illustrated in Figure 9B. Note that 98 and 101 are directly connected, whereby liquid under pressure is applied to the motor 59 of the winch unit 36. Thus this winch unit is operated to wind up the cable. Assuming that both hand levers 131 and 132 are operated simultaneously, the control valve is conditioned in the manner shown in Figure 9C.

It will be evident that the features of our machine make possible rapid and complete control over all of the operations of the earth mover, and at the same time permit the winch units to be located conveniently on the crossbeam 13. The system is pneumatic, hydraulic and electrical in its operation. This is desirable because it makes possible development of sufficient torque for the cable winding operations, while at the same time facilitating rapid control in the operation of the fluid motors, and rapid and sensitive control over release of the cable braking devices for cable unwinding operations. No conventional driving connections are required between the winch units and the tractor engine. Mechanical clutches are completely eliminated. A particular cable can be wound up or played out with full control of the operator and with a minimum amount of wear on the mechanical parts.

We claim:

In cable operating means for earth movers of the type including a main bowl carried by a wheeled frame and having a forward ground digging blade and means for discharging a load from the same, together with an apron carried in front of the bowl and adapted to be raised or lowered relative to the digging blade, and at least two cables for raising and lowering the cutting blade, for raising and lowering the apron and for operating the load discharging means; said cable operating means comprising two winch drums on which the cables are wound, individual fluid operated motors, each motor having a liquid inlet adapted to be supplied with a liquid under pressure for operating the motor, and also having an outlet connection through which the liquid is exhausted from the motor, each motor being connected to an associated drum for driving the same, self-energizing braking means for each drum serving to retain the drum against cable unwinding rotation but permitting cable winding rotation upon energizing the associated motor, a pneumatic operating device connected to each braking means for releasing the same to permit unwinding rotation, a liquid pump, control valve means, piping for connecting the liquid pump to the control valve means and to said motors, a pair of pneumatic operators for operating said control valve means, a pair of manual control levers, pneumatic valve means conditioned by movement of said levers, said pneumatic valve means being connected to a source of air under pressure, connections from said pneumatic valve means to the pneumatic operators associated with the brake releasing means and also the pneumatic operators associated with the control valve means, each of said levers having three operating positions, in one of which the control valve means is conditioned to provide a fluid bypass about the pump and also a bypass between the inlet and outlet connections of one of the motors, one lever in a second position serving to condition the control valve means to supply liquid under pressure from the pump to the corresponding motor to rotate the winch and thereby wind up the cable, said one lever in its third operating position serving to provide a bypass between the inlet and outlet connections of the corresponding motor and to effect release of said energizing means to permit unwinding rotation of the drum, said second hand lever in a second of its operating positions serving to condition the control valve means to supply liquid under pressure from the pump to its corresponding motor and in its third operating position serving to form a bypass between the inlet and outlet connections of the corresponding motor, and also serving to release the self-energizing braking means for the other drum.

References Cited in the file of this patent

UNITED STATES PATENTS

| | | |
|---|---|---|
| 2,199,668 | Lawler | May 7, 1940 |
| 2,354,386 | Lawler | July 25, 1944 |
| 2,354,387 | Lawler | July 25, 1944 |
| 2,411,038 | Hetteen | Nov. 12, 1946 |
| 2,495,336 | LeTourneau | Jan. 24, 1950 |
| 2,537,267 | Gurries et al. | Jan. 9, 1951 |
| 2,573,765 | Gustafson | Nov. 6, 1951 |
| 2,628,815 | Atkinson et al. | Feb. 17, 1953 |

FOREIGN PATENTS

| | | |
|---|---|---|
| 674,123 | Great Britain | June 18, 1952 |